United States Patent
Dudley

(10) Patent No.: US 9,032,027 B2
(45) Date of Patent: May 12, 2015

(54) ENHANCED CONSUMER ENGAGEMENT USING ADVANCED COMMUNICATION EXCHANGE SERVICES

(71) Applicant: William Dudley, Lovetsville, VA (US)

(72) Inventor: William Dudley, Lovetsville, VA (US)

(73) Assignee: Sybase, Inc., Dublin, CA (US)

(*) Notice: Subject to any disclaimer, the term of this patent is extended or adjusted under 35 U.S.C. 154(b) by 0 days.

(21) Appl. No.: 14/010,534

(22) Filed: Aug. 27, 2013

(65) Prior Publication Data

US 2015/0066641 A1    Mar. 5, 2015

(51) Int. Cl.
*G06F 15/16* (2006.01)
*G06Q 30/02* (2012.01)

(52) U.S. Cl.
CPC ........ *G06Q 30/0261* (2013.01); *G06Q 30/0271* (2013.01); *G06Q 30/0253* (2013.01)

(58) Field of Classification Search
None
See application file for complete search history.

(56) References Cited

U.S. PATENT DOCUMENTS

| | | | |
|---|---|---|---|
| 2006/0123116 A1* | 6/2006 | Rahman et al. | 709/227 |
| 2009/0187623 A1* | 7/2009 | Narayanaswami et al. | 709/204 |
| 2013/0185203 A1* | 7/2013 | Rock et al. | 705/41 |
| 2014/0129939 A1* | 5/2014 | Story et al. | 715/716 |
| 2014/0136615 A1* | 5/2014 | Li | 709/204 |
| 2014/0181009 A1* | 6/2014 | Alexander | 707/609 |

* cited by examiner

*Primary Examiner* — Creighton Smith

(57) ABSTRACT

Various embodiments of systems and methods for enhancing consumer engagement using advanced communication exchange services are described herein. The method involves receiving by a consumer device an address book entry from an enterprise device. The consumer device is enabled with enhanced address book capability provided by any advanced communication exchange systems. Further, in an aspect, the received address book entry is activated to enable the enterprise device to push business information to the consumer device. In another aspect, selecting the address book entry invokes the advanced communication services supported by the enterprise device. By accessing one or more of the advanced communication services, business information from the enterprise device is received via the selected communication exchange service. In an aspect, the received business information is customized based on online presence information of the consumer device.

17 Claims, 5 Drawing Sheets

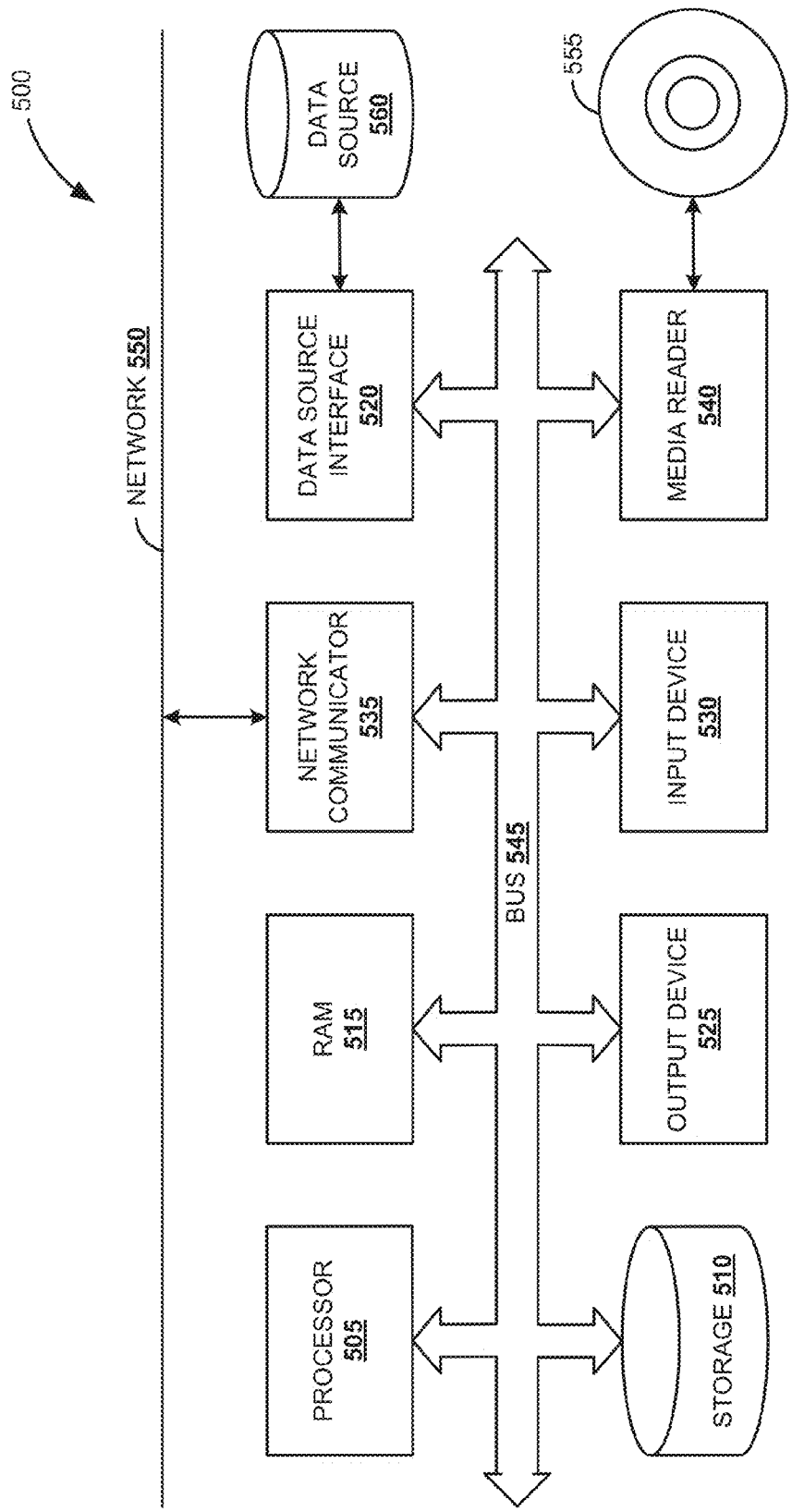

ENHANCED CONSUMER ENGAGEMENT USING ADVANCED COMMUNICATION EXCHANGE SERVICES

BACKGROUND

Advanced communication exchange services such as the Rich Communications Suite (RCS) were defined with the aim of producing an umbrella of advanced communication services prioritizing the interoperability of services across network owners and handset manufacturers. One of the main services used as part of RCS is enhanced address book (EAB), including service capability and social presence. Social presence was defined by early developers as the "degree of salience of the other person in the interaction and consequent salience of the interpersonal relationships." As computer-mediated communication has evolved, a inure relational view of social presence has emerged and has come to be viewed as the way individuals represent themselves in their online environment.

Social presence is a status indicator that displays the availability of an individual to engage and connect with other persons in their online community. Social presence indicators can vary from a simplistic red-amber-green colored indication to a complex Session Initiation Protocol for Instant Messaging and Presence Leverage Extensions (SIMPLE) and the Extensible Messaging and Presence Protocol (XMPP). Social presence indicators provide real-time information regarding the various communication-means that are available to get in touch with their contact such as Instant Messaging services, Social networks, Video calling, file sharing, etc. Such social presence information can be used to stimulate new and impulsive communication interactions.

Social presence is indicated by the user and often cached at a network level for others to easily identify the presence status indicated by the user. Nowadays it is common for an individual to be simultaneously present in two or more networks, via communications, for instance, through his/her smartphone, which may be simultaneously registered in a core network, instant messaging (IM) communities (MSN Gmail™), and Social Networks that manage presence information. However, so far the social presence information has been leveraged only by a restricted group of individuals such as the user's personal contacts.

SUMMARY

Various embodiments of systems and methods for enhancing consumer engagement using advanced communication exchange services are described herein. In an aspect, the method of enhancing consumer engagement in advanced communication systems involves receiving by a consumer device an address book entry from an enterprise device. The consumer device is enabled with enhanced address book capability provided by an advanced communication exchange systems. Further, the received address book entry is activated to enable the enterprise device to push business information to the consumer device. In another aspect selecting the address book entry invokes the advanced communication exchange services supported by the enterprise device. By accessing one or more of the advanced communication exchange services, business information from the enterprise device is received via the selected one or more communication exchange services. In yet another aspect, the received business information is customized based on online presence information of the consumer device.

These and other benefits and features of embodiments-will be apparent upon consideration of the following detailed description of preferred embodiments thereof, presented in connection with the following drawings.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 5 is a block diagram of an exemplary computer system according to one embodiment.

DETAILED DESCRIPTION

Figure 1:
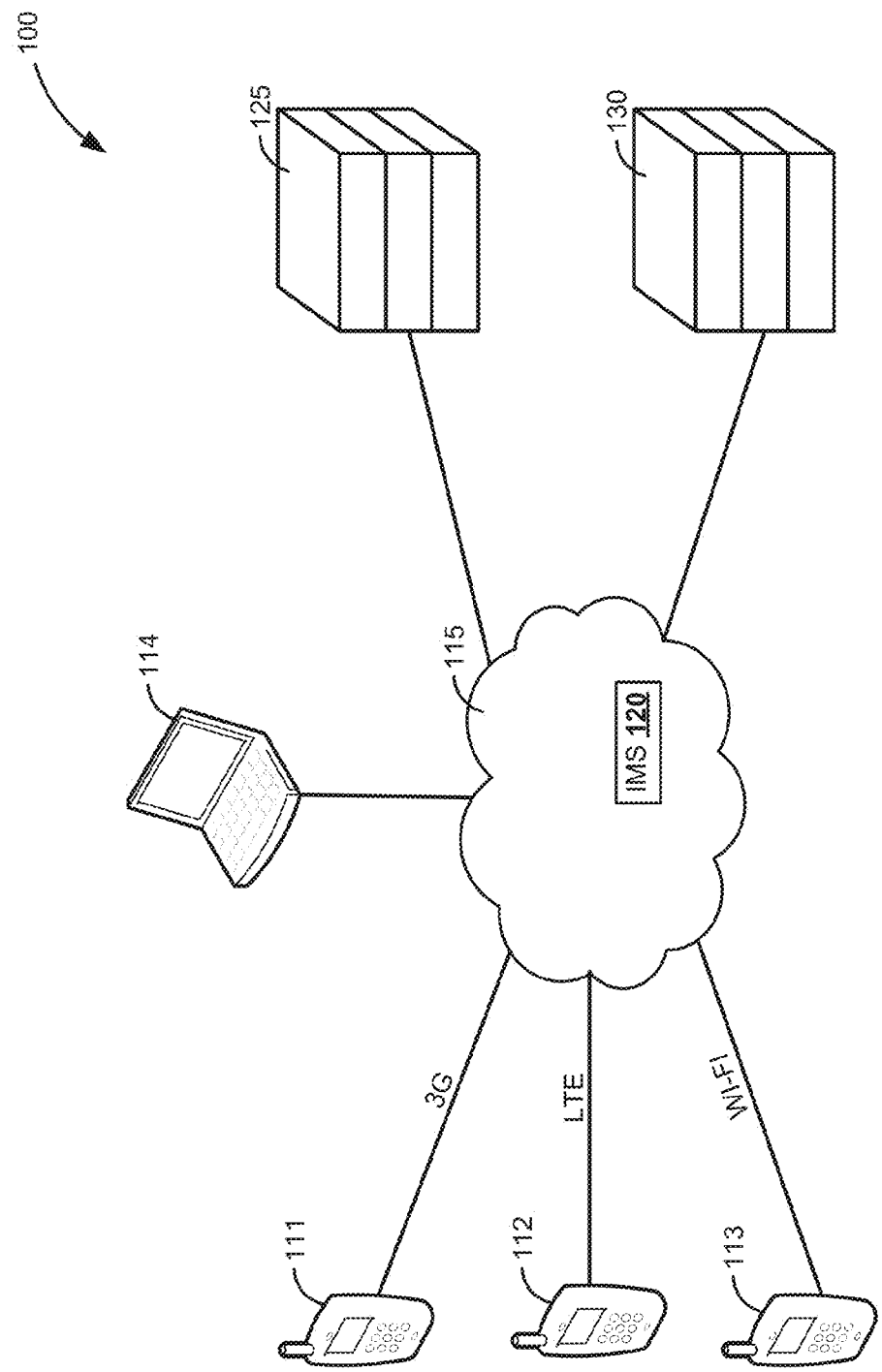
FIG. 1 is a conceptual diagram of a technique for enhancing consumer engagement using advanced communication services, according to one embodiment.

Embodiments of techniques for enhancing consumer engagement using advanced communication services are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments. The emergence of a Rich Communications Ecosystem (RCE) will enable mobile users to send IM, live video chat and exchange files across enabled devices on any mobile network.

Enriched communication ecosystem such as Internet Protocol (IP) Multimedia Subsystem (IMS)/RCS and other related advanced communication services are becoming popular among consumers as they provide enriched user experience. Such services and applications have introduced enhanced address book feature showing dynamically changing status and on-line capabilities, various messaging options and content sharing capabilities of address book contacts. These capabilities are available not only on a personal computer (PC) level but also on a mobile device level, where there is open communication between devices and networks. Service discovery is a keystone to boost the usage of richer communication services. Additionally, the Rich Communications ecosystem enriches the user experience further by providing visualization features. In addition, the Enhanced Phonebook feature enables communication to be initiated from the phonebook by selecting a communication type (e.g., calling, messaging, file sharing, video sharing, etc.).

The accessibility of consumers' online presence information and communication capabilities in real time can be leveraged by brands and enterprises for enhancing consumer engagement. For example, enterprises can deliver customized business information and better engage with consumers based on the knowledge of consumers' online presence and multi-media capabilities. The term "enterprise" as used herein refers to a commercial or industrial enterprise that undertakes business ventures. Examples of enterprise includes restaurants, supermarkets, pharmacies, stores, news agencies, banks, airlines, hotels, dealers, or other business entity involved in exchange of services or goods. The term "consumer" as used herein refers to persons buying and/or using goods or services provided by an enterprise. In order for an enterprise to be able to monitor a consumer's online presence information, the enterprise has to be added to the consumer's active address book entry. Certainly, the enterprise can incentivize the consumer to allow its active address book entry to "push" content such as coupons or various types of media from simple text to full video to the consumer's device (or devices). Examples of consumer device include, smartphones, tablet PCs, PCs, Notebooks, Laptops, etc. Once the enterprise gains entry into the consumer's address book, the enterprise can promote multiple, enhanced levels of business interactions by using various attributes such as geo-location (e.g., nearest branch), taglines (latest deals/promotions), Uniform Resource Locators (URLs), Coupons, Opinion polls, etc. Likewise, the consumer can control the level of interactivity for each enterprise by setting how much visibility or engagement an enterprise can provide to the consumer.

Such "acquisition" methodology may also support legacy and/or alternative systems. For example, if a consumer responded to an advertisement from a network or subscription that did not support such advanced communications such as RCS, then the response and further interaction with the consumer can take place using existing media, mobile app download and engagement, Short Message Service (SMS) or Multimedia Message Service (MMS) messages or direction to an Internet site location (e.g., either Hyper Text Markup Language 5 (HTML5) or "normal" mobile-friendly location), Similarly, the consumer may only wish to engage with the brand or business via legacy, store and forward type technologies such as SMS or MMS. In these cases, messages would simply be pushed to the consumer's inbox. Likewise, the consumer would use legacy messaging to engage back with the business or brand, should that option exist. This consumer engagement ecosystem gives rise to a variety of methods that would be available to both the consumer and the brand or business to interact incentivize and engage the consumer.

In telecommunications environment, some practices may call for consumers to "opt-in" or to explicitly approve engagement of an entity such as a brand or enterprise to send content to those consumers. Additionally, enterprises may use a variety of methods to acquire a consumer—from print advertisements to website banners to video advertisements. In such ecosystem, enterprises may, for example, utilize the short code SMS method for consumer acquisition. For example, a consumer may see an ad that states:

Add us to your address book. Text "ADDME" to 12345
Upon texting "ADDME" to short code 12345, the consumer would receive an SMS or MMS from short code 12345 with an address book entry containing; elements about an enterprise or business. The consumer then adds the entry to his/her address book. The address book entry thus entered may not be active by default. At this point it is just a static entry. Next the consumer may receive further instructions that detail how to allow the address book entry to engage the consumer via multiple communication methods that are available in the communications system. For example, the consumer could allow the business to "see" his own presence status or the consumer could limit how the business or brand could contact it. However, the brand or business's presence indicators would show how the consumer could communicate or interact with the enterprise.

Once the consumer "activates" or allows the address book entry to become active and to potentially monitor the presence of the consumer, the "opt-in" phase is complete. Depending on the nature of the address book entry, an additional opt-in step via one of the available communications methods may be required. For example, the consumer may be required to confirm an address, enters a PIN or performs some other authentication step to assure opt-in (called a double-opt-in or two-factor authentication). Once the consumer activates an enterprise's address book entry, the enterprise can enhance it visibility (presence) to the consumer by leverage various attributes such as: displaying the enterprises geo-location (nearest business), taglines on latest promotions, URLs, etc. Using options such as Instant Messaging, the enterprise may push rich-media formation to an unified in-box or even a file containing a detailed product specification, for "offline" review, to the consumer device. Similarly, the consumer can control the level of interactivity for each enterprise or business entity by setting how much visibility or engagement an enterprise can provide to the consumer. Alternatively, the consumer might be able to reach a customer service representative via voice or video call.

In an example, if the address book entry corresponding to an enterprise is selected by a consumer, the service capabilities associated with the enterprise are returned to the consumer. Examples of service capabilities include a message exchange (such as SMS, MMS, IMS, etc.), a Wireless Application Protocol (WAP) exchange, a structured or unstructured data transfer, a data transfer operation atop one or more proprietary or standards-based protocol, an Electronic message (E-Mail) exchange, an IM exchange, Wi-Fi®, a Near Field Communication (NFC) exchange, etc. In an example, if the enterprise device is enabled to process a "video call," a corresponding icon visually indicates an active status, and selecting that icon by the consumer, would start off the latest pre-recorded video in lieu of a 2-way call. The pre-recorded video may be a promotional message, an endorsement, advertisement, product demo, etc. Similarly, the enterprise may engage the consumer by pushing business information through any combination of SMS, MMS, IMS messaging, web-based facility, e-mail, data transfer operations, geographic information system (GIS) or other visualization facility. In an aspect, the business information is selected from a pool of information elements, such as factoids, product information, advertisements, promotional items, coupons, vouchers, surveys, questionnaires, gift cards, retailer credits, etc.

In an example, a consumer responds to a print advertisement of a restaurant via Text Messaging to a short code mentioned in the advertisement. In response to receiving the text message from the consumer, the restaurant sends an address book entry containing the restaurant's name, address, phone number(s), links for IM or other communications methods as well as URLs. The consumer then sets his visibility to the restaurant and effectively allows the restaurant to communicate with the consumer. Later, when the consumer wishes to book a reservation, he can simply use the IM Chat capability (if that availability is shown by the restaurant); otherwise, he can call or simply leave a written message (e.g. store and forward SMS/MMS) to make the reservation. At another time, the restaurant may want to promote new menu items. These can be pushed to the consumer's in-box, or, based on the location of the consumer, the restaurant could push a coupon or menu items or "specials" to the consumer's device.

The concept of enhancing consumer engagement using advanced communication ecosystems is described with reference to a conceptual system shown in FIG. 1. FIG. 1 is a high level block diagram illustrating system environment 100, in accordance with one embodiment. The system environment 100 comprises one or more consumer devices 111, 112, and 113 and an enterprise device 114 connected to a network operator's core network 115 via a variety of connection methods. These may include $3^{rd}$ generation (3G) GPRS, High Speed Packet Access (HSPA)/HSPA+, Wi-Fi®, Broadband Access (BA), WiMAX® or Long Term Evolution (LTE). The one or more user devices 111, 112, or 113 and the enterprise device 114 may include any device suitable for IP communications such as a mobile telephone, smart phone, personal digital assistant, laptop with data card, or laptop or PC connected over BA or Wi-Fi®. IMS 120 is in communication with the core network 115 of the network operator or service provider. The IMS 120 provides a form of Fixed-Mobile Convergence (FMC) which aids in the communication of multimedia and voice applications from wireless to fixed terminals. Additionally, in communication with the network 115, and hence available to the user devices 111-113 and enterprise device 114, are multiple servers such as presence server 125 and instant messaging servers 130 which provide facilities and cloud storage for instant messaging and presence information publishing services.

RCS and IMS use Session Initiation protocol (SIP) protocol in order to control the multimedia communications sessions over IP defined in the suite, SIP is a text-based protocol where each transaction involves a client request that invokes a particular method or function on the relevant server and a response. Once the sessions have been initiated, other protocols may be used to facilitate communication, such as the message session relay protocol (MSRP) or Real-Time Transport Protocol (RTP). MSRP is typically used in RCS for instant messaging, file transfer and image sharing while RTP is used for video sharing. It should be noted that the protocols and services described herein are for exemplary purposes, and any suitable protocols may be utilized to realize the described concepts.

In the RCS specification, the SIP request and response model is used for a variety of functions. An example of this is the SIP PUBLISH method which is used to make public the device capabilities of a client (e.g., enterprise device 114). For example, the device 114 may use the SIP PUBLISH method to send to a server 125 (in RCS this is the presence server) that the device 114 is an RCS capable device and which services the device is suitable for. This device information would then be stored to be retrieved subsequently from the presence server 125 by another client (e.g., consumer device 111, 112, or 113) using a SIP SUBSCRIBE method. The SIP SUBSCRIBE method may be anonymous and would return the RCS capabilities of the consumer device 111, 112, or 113 in question. RCS uses the session initiation protocol for instant messaging and presence leveraging extensions (SIMPLE) to define the social presence implementation.

SIMPLE uses the SIP request PUBLISH to allow enterprise device 114 to inform the presence server 125 of its current status. Common status messages may include "out to lunch," "busy," "away," and "online." A consumer device 111, 112, and 113 may subscribe to receive presence updates from the presence server 125 for a particular enterprise device 114. When the social presence is uploaded to the presence server 125, the message may be pushed to the consumer device 111, 112, or 113.

When the enterprise device 114 publishes the social presence information to the presence server 125, the presence server 125 uses the SIP response "200 OK" to acknowledge receipt. The presence server 125 then pushes the social presence information to the subscribed watchers (consumers, e.g., 111, 112, or 113, who have opted-in) using the SIP request NOTIFY, The response from the watcher will then return "200 OK" as a response. Free text social presence status is possible using the SIMPLE framework where the PUBLISH request can incorporate the user's desired status message.

Social presence is a component of the RCS enhanced address book (EAR), another feature of which is service capability information. Typically, contacts in the address book may be identified as to whether they are using devices having advanced communication capabilities such as RCS. The advanced communication capabilities include services that the devices is capable of supporting, for example, a device may have a front facing camera and is therefore capable of video calling. Such service capability information is stored in the presence server along with the presence information. Service capabilities may be published using the SIP PUBLISH method in a manner similar to social presence publication. As with social presence, information for these capabilities are forwarded to subscribed users. If a user uses an advanced communications capable device, the capabilities will be published in the presence server and published to subscribed contacts.

Additionally, within RCS, when a voice call is set up, the devices may exchange capabilities. If, during a voice call, the user wishes to share some content, a SIP INVITE request may be forwarded to all capable clients in the conversation. If the user accepts the invitation, a '200 OK' response may be sent. The SIP OPTIONS exchange message may be used to update the device's capability of sharing the content during a call.

In an embodiment, upon the consumer selecting an enterprise from his/her address book, the device performs an instant service capability check when displaying the available services. The capabilities returned in response to the selection represent the list of services that are enabled in an enterprise's device 114 at a certain point in time. There may be a number of factors that affect the device capabilities such as the enterprise's network provisioning, hardware limitations, memory limitations, battery backup, etc. For example, network provisioning may restrict the enterprise to chat or file sharing but not video calling, Hardware limitations such as the absence of front camera and/or video processing features may restrict the capabilities to conduct a video call. The enterprise device 114 may not be able to receive files if the storage is full or it may not be able to use advanced communication if the device has a low battery. Further, software capabilities, network quality, and mutual software compatibility between the devices may affect the device capabilities. Based on the device capability information displayed on the consumer's device 111, 112, or 113, the consumer is able to determine what services are available to communicate with the enterprise. Similarly, the enterprise device 114 can leverage the social presence and capabilities information pertaining to a consumer and push relevant business information via a combination of communication services that are supported by the enterprise device 114. The term "relevant business information" as used herein may refer to business information that is adapted/customized according to the consumer's presence information, geo-location lag, and service capability information.

Figure 2:
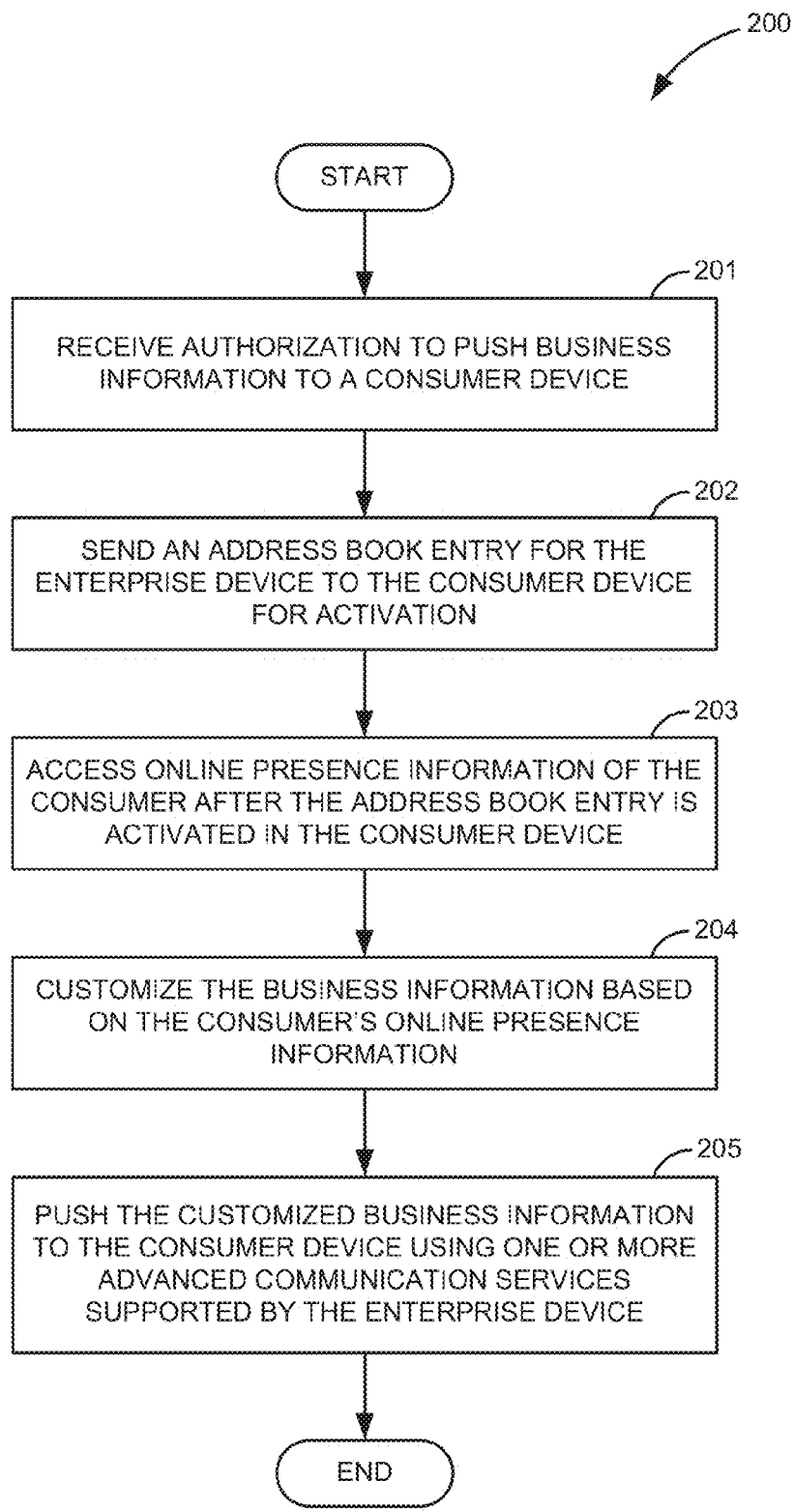
FIG. 2 is a flow diagram of a process for enhancing consumer engagement using advanced communication services, according to one embodiment.

The process of enhancing consumer engagement using advanced communication services such as RCS is described with reference to FIG. 2. Portions of process 200, as shown in FIG. 2, are performed at a communication device having one or more processors and non-transitory memory, which stores one or more instructions to be executed by the one or more processors of the device. The communication device is an enterprise device connected to a core network which is in turn connected to one or more devices associated with one or more consumers. The process 200 involves receiving authorization from the consumer device to push business information to the consumer device, at 210. In an aspect the consumer device is enabled with enhanced address book capabilities among other advanced communication services supported by the consumer device. In an embodiment, the authorization is provided by the consumer device by responding to an enterprise's offer for enhanced consumer engagement. For example, the enterprise may reach out to the consumers using various means such as print advertisements, website banners, multi-media advertisements, etc., seeking consumers' participation in the enhanced consumer engagement program. A consumer may respond to the offer by "opting-in" or "signing-up" to the program. By "opting-in" or "signing-up" to the program, the consumer expressly authorizes the enterprise to actively engage with the consumer using advanced communication services such as provided by RCS. In an example, the consumer may express his/her consent by simply sending a short code SMS. In another example, the consumer may express his/her consent by providing personal information such as phone number, age, gender, etc., on a web-page and agreeing to terms and conditions of the program. Alternatively, the consumer may simply call a given contact number and provide his/consent following an interactive Voice Response (IVR) or support personnel.

At 220, in response to receiving the authorization from the consumer, the enterprise device sends an address book entry to the consumer device for activation. In an aspect, the address book entry is a static entry and may include the enterprise's name, address, phone number(s), links to various communication modes (IM, WAP, maps, Uniform Resource Locator (URLs), etc. In some aspect, the mere adding of the address book entry to the consumer's contact list may activate the address book entry. In some other aspect, an additional step to explicitly activate the address book entry may be required. For example, the consumer may receive further instructions that detail how to allow the address book entity to engage the consumer via multiple communication services that are supported by the consumer device.

At 230, in response to activating the address book entry in the consumer device, the enterprise device accesses the online presence information of the consumer from a presence server. The online presence information includes, but is not limited to, geo-location information, advanced communication service capabilities information, online status information, and user preference information. The geo-location information provides the current physical location of the consumer device. User preference information may include user profile data such as age, gender, occupation, etc. The advanced communication service capabilities information refers to information regarding the various communication exchange means available and supported by the consumer device. Examples of such communication exchange means include Short Message Service (SMS), Multimedia Message Service (MMS), Internet Protocol (IP) Multimedia Subsystem (IMS), Wireless Application Protocol (WAP) exchange, structured data transfer, unstructured data transfer, Electronic message (E-Mail) exchange, Instant Messaging (IM) exchange, Wi-Fi®, Near Field Communication (NFC) exchange, etc.

At 240, the enterprise device customizes the business information based on the online presence information. The term "business information" as used herein may refer to factoid, product information, advertisement, promotional offer, coupon, gift voucher, survey questionnaire, opinion poll, catalogue, menu, retailer credits, etc. In an aspect, the business information is customized by adapting the business information according to a current geographic location of the consumer device. The current-geographic location refers to the current physical location of the consumer device and such information may be obtained as part of the online presence information of the consumer device from the presence server, or through, inter aria, a Location-Based Service (LBS) or a Global Positioning System (GPS) facility.

In an aspect, the business information may be customized by selecting location specific business information elements from a repository of business information elements. In an aspect, the business information in the repository is pre-defined and may be already classified into region-specific, language-specific, season-specific, gender-specific, age-specific, occasion-specific, service-specific, etc., information pools. For example, for a customer who is currently located in San Francisco, an enterprise having a chain of stores selling clothing items my push only the business information that is relevant to a store in San Francisco. The business information may be, for example, a catalog of clothing items that are in stock and on sale in the San Francisco store. Such information may be further scrutinized based on the communication services that are supported by the consumer device. For example, the catalog may be available as a text file, a video stream, an audio clip, a short message, MMS, etc., and depending on the communication exchange that is available and supported by the consumer device, the enterprise device selects the appropriate format of the catalog for pushing to the consumer device. If the consumer device supports IMS, then the catalog may be pushed as a video clip of a pre-recorded video call, where the selection of a video call icon corresponding to the enterprise's address book entry, instantly plays the video clip on the consumer device.

In another embodiment, the location information of the consumer device may be used to trigger content to be sent to the consumer device such as text with or without embedded rich media, 1 or 2 way video, voice calls, or store and forward messaging (SMS and/or MMS).

In another aspect, the enterprise device may customize the tagline as displayed in its address book entry on the consumer device according to the current location of the consumer device. For example, based on the current location of the consumer device, the enterprise device can calculate the physical distance between the consumer device and the nearest store and display the distance information as the tagline. Also, depending on the time and date, the tagline may notify whether the store is open or closed.

At 250, the customized business information is pushed to the consumer device via one or a combination of communication exchange means supported by the enterprise device.

Figure 3:
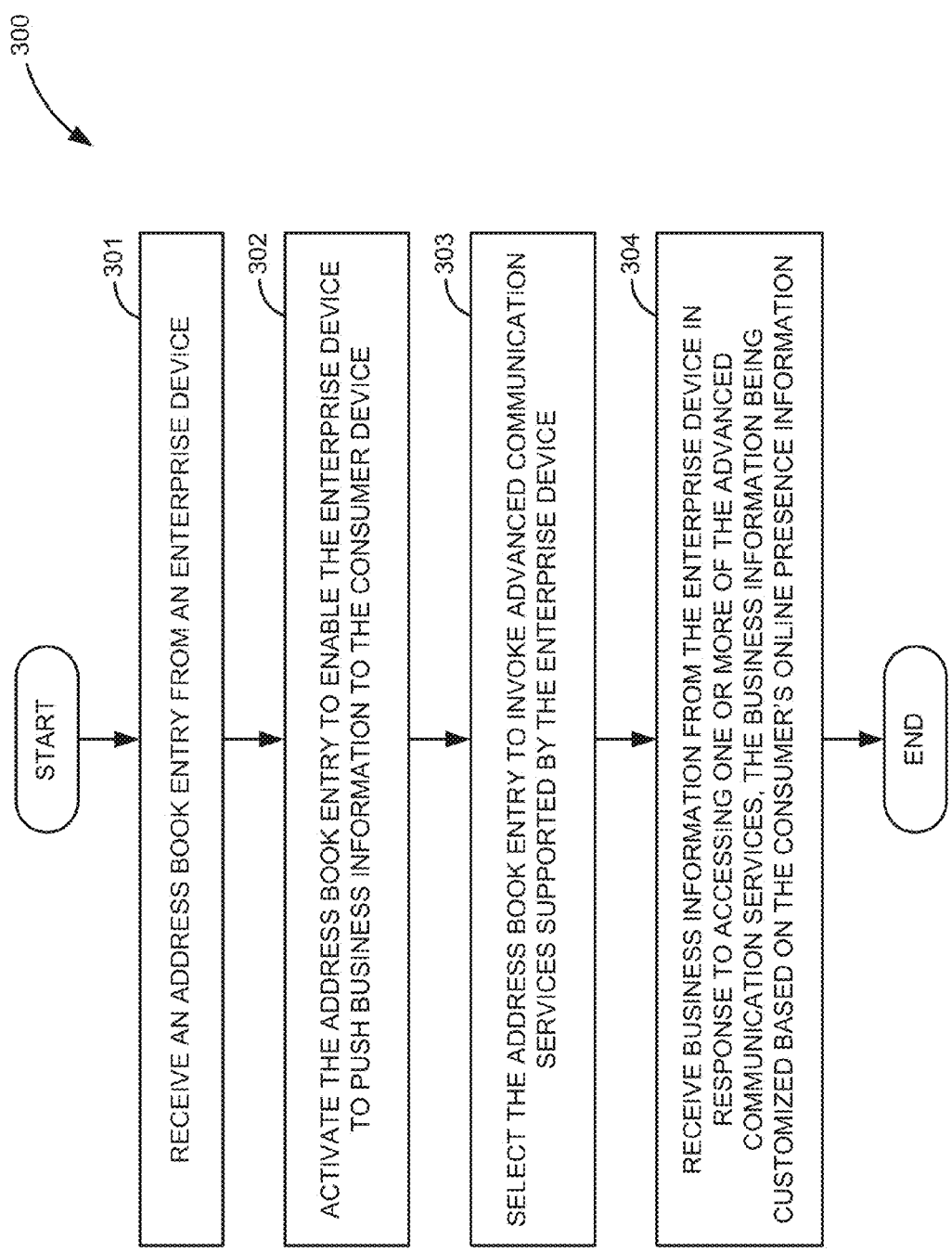
FIG. 3 is a flow diagram of a process for enhancing consumer engagement using advanced communication services, according to another embodiment.

The flow diagram in FIG. 3 illustrates process 300 of enhancing consumer engagement according to one embodiment. As shown in FIG. 3, at 310, a consumer device receives an address book entry from an enterprise device. The address book entry may be sent by the enterprise device in response to the consumer opting-in or signing-up to participate in the enhanced consumer engagement program. The address book entry may be received via text message (SMS) to short code, text message (SMS) to long code, IM message to specific URL or address.

At 320, the address book entry is activated on the consumer device. In an aspect, the address book entry may be activated by merely adding the address book entry to the address book/contact list of the consumer device. In another aspect, the consumer may be required to expressly activate the address book entry. By activating the enterprise's address book entry on the consumer device, the consumer device authorizes and enables the enterprise device to subscribe for online presence information pertaining to the consumer device. Also, by activating the address book entry, the consumer device is allowed to make itself visible to the consumer, such that, each time the consumer selects the enterprise's address book entry, the enterprise tag line, and active links to communication exchange services are displayed on the consumer device.

At 330, the address book entry is selected to invoke the advanced communication exchange services supported by the enterprise device. The advanced communication exchange services refer to those communication exchange services that are available and supported by the enterprise device. However, in order to interact with the enterprise device via IM, call, or two way video, the participation of an enterprise personnel at the enterprise device end may be required. The availability of the enterprise personnel to interact/communicate is referred to as status information. In an aspect, such status information is provided as a visual cue to the observer (herein, the consumer) such that, the consumer can readily determine whether the enterprise personnel is available to chat or talk or transfer data or media files. For example, if the enterprise device supports instant messaging with only text, text messaging with rich media sharing, 2-way video, voice calls, SMS and MMS, the corresponding icons are displayed upon selection of the address book entry. However, the enterprise personnel may not be available to interact via all of the communication exchange means at a given point in time. For example there may be a number of factors that affect the device capabilities such as the enterprise's network provisioning, hardware limitations, memory limitations, battery backup, etc. For example, network provisioning may enable the enterprise to interact via chat or file sharing but not video calling. Hardware limitations such as the absence of front camera and/or video processing features may restrict the capabilities to receiving file transfers. The enterprise device may not be able to receive files if the storage is full or it may not be able to use advanced communication if the device has a low battery. Further, software capabilities, network quality, and mutual software compatibility between the two devices may affect the device capabilities.

Based on the availability status of the enterprise personnel, the icons corresponding to the communication exchange services are rendered in a visually distinguishing manner. For example, the icons corresponding to the communication exchange services where the enterprise personnel is active to communicate may be rendered as a colored graphic image while the other icons may be rendered as a grayscale image.

The consumer may then select the links corresponding to the communication exchange services which have an active status indicator. By selecting a link, the business information that was pushed by the enterprise device is received on the consumer device, at 340. The business information thus received is customized according to the online presence information of the consumer. In an example, based on the age and/or gender, the enterprise device may push relevant business information to the consumer device through a combination of one-way video, MMS, tagline, IM with rich media sharing capabilities. If the consumer selects the link to one-way video feature provided alongside the enterprise's address book entry, a video clip holding business information relevant to the consumer's age and gender may be played back to the consumer. Similarly, upon selecting the link to IM, the consumer may be able to reach and chat with an enterprise support personnel. The consumer may interact with the support personnel and receive product catalog, brochures, or any such via file transfer facility in the IM.

Figure 4:
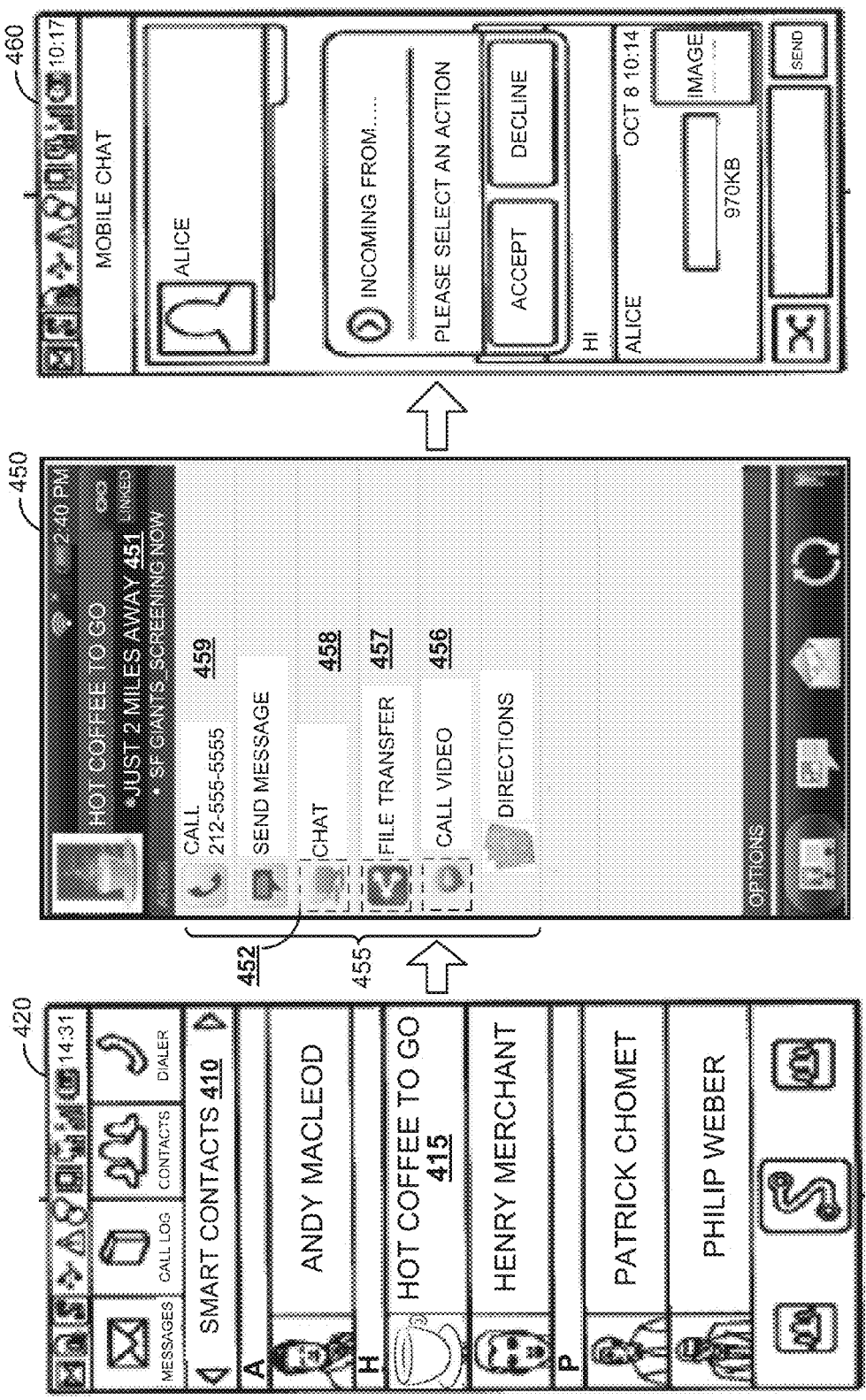
FIG. 4 illustrates an exemplary interface showing enhancing address book feature, in accordance with an embodiment.

The process of selecting an address book entry and receiving business information from the enterprise device are illustrated with reference to an exemplary interface showing the enhancing address book feature, with reference to FIG. 4. FIG. 4 includes interface 420 such as a graphical user interface showing an enhanced address book feature in a communication device associated with a consumer. In the illustrated example, the enhanced address book has, among other contacts 410, address book entries of enterprises and brands. As shown, one of the enterprise address book entry 415 corresponds to that of a coffee shop "Hot Coffee to Go." Upon selecting the address book entry 415, interface 450 is rendered showing the various communication exchange services 455 supported by the enterprise device. From the displayed interface 450, the consumer can readily determine the various options available for the consumer to communicate with the coffee shop. For example, the consumer may want to know if coffee shop has a big screen and if it screens the baseball game that evening. The consumer may get that information by selecting the link 456 to one-way video, or a link 457 to brochure and find the information regarding the evening's agenda at the coffee shop. Alternatively, the consumer may reach one of the coffee shop personnel via chat 458 or call 459. The status indicator 452 however indicates that the coffee shop is available to interact only via chat 458, file transfer 457, or video call 456. If the consumer chooses to chat with the coffee shop personnel via IM, then the consumer may simply select the link 458 to chat and the person at the coffee shop may respond to the consumer. The consumer may receive menu, brochures, coupons, and any other information via file sharing feature during chat. As shown in the interface 460, the consumer may accept the file being transferred from the coffee shop.

In an aspect, as shown in the interface 450, the coffee shop my dynamically change the tagline 451 that is displayed on the consumer device according to the geo-location of the consumer. For example, the enterprise device can calculate the distance between the consumer device and the nearest coffee shop and display the distance information in the tagline. Similarly, the tagline 451 may display such information as the screening of the baseball match of the coffee shop closest to the consumer device is screening the match on a big screen. Other information that may be available to the consumer from the address book entry may be maps and directions.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

FIG. 5 is a block diagram of an exemplary computer system 500. The computer system 500 includes a processor 505 that executes software instructions or code stored on a computer readable storage medium 555 to perform the above-illustrated methods. The processor 505 can include a plurality of cores. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. According to some embodiments, such as some in-memory computing system embodiments, the RAM 515 can have sufficient storage capacity to store much of the data required for processing in the RAM 515 instead of in the storage 510. In some embodiments, all of the data required for processing may be stored in the RAM 515. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above derailed description. Rather, the scope is to be determined by the following claims, which are to be interpreted in accordance with established doctrines of claim construction.

What is claimed is:

1. A method of enhancing consumer engagement in advanced communication systems, the method comprising:

receiving, by an enterprise device, authorization to push business information to a consumer device, wherein the consumer device is enabled with enhanced address book capabilities;

sending an address book entry for the enterprise device to the consumer device for activation;

upon activation of the address book entry in the consumer device, accessing online presence information of a consumer associated with the consumer device;

customizing the business information based on the consumer's online presence information, wherein customizing the business information based on the consumer's online presence information comprises selecting one or more information elements from a repository of information elements according to communication services supported by the consumer device; and pushing the customized business information to the consumer device via one or more advanced communication services supported by the enterprise device.

2. The method of claim 1, wherein accessing the online presence information of the consumer associated with the consumer device comprises accessing information relating to the consumer's geo-location and advanced communication services supported by the consumer device.

3. The method of claim 1, wherein customizing the business information based on the consumer's online presence information comprises adapting the business information according to a current geographic location of the consumer device.

4. The method of claim 3, wherein adapting the business information according to the current geographic location of the consumer device comprises selecting a relevant one or more information elements from a repository of information elements based on the current geo location of the consumer device.

5. The method of claim 1, wherein customizing the business information based on the consumer's online presence information comprises selecting the one or more information elements from at least one of a region-specific information pool, age-specific information pool, gender-specific information pool, season-specific information pool, occasion-specific information pool, a language-specific information pool, and a communication service-specific information pool.

6. An article of manufacture, comprising:
a computer readable storage medium having instructions which when executed by a computer causes the computer to:
receive, at a consumer device, an address book entry from an enterprise device, wherein the consumer device is enabled with enhanced address book capability;
activate the address book entry to enable pushing of business information from the enterprise device to the consumer device;
select the address book entry to invoke advanced communication services supported by the enterprise device, wherein the advanced communication services comprise a list of communication services that are enabled in the enterprise device at a certain point in time; and
receive, at the consumer device, business information from the enterprise device in response to invoking one or more of the advanced communication services, wherein the received business information is customized based on online presence information of the consumer device.

7. The article of manufacture of claim 6, wherein receiving the address book entry comprises receiving a virtual identity of the enterprise device in response to signing up for a consumer engagement program offered by an enterprise associated with the enterprise device.

8. The article of manufacture of claim 6, wherein receiving the address book entry comprises receiving a short code message having the address book entry.

9. The article of manufacture of claim 6, wherein activating the address book entry comprises enabling the enterprise device to receive the consumer device's online presence information and to push business information.

10. The article of manufacture of claim 6, wherein the consumer device's online presence information includes information relating to the consumer's geo-location, taglines, and types of communication services enabled in the consumer device.

11. A system operating in a communication network, comprising:
a consumer device;
a presence server; and
an enterprise device comprising a memory to store a program code, and a processor to execute the program code to:
receive authorization to push business information to the consumer device, wherein the consumer device is enabled with enhanced address book capabilities;
send an address book entry for the enterprise device to the consumer device for activation, wherein the address book entry includes enterprise's name, address, phone number(s), links to various communication modes, and Uniform Resource Locator (URL);
upon activation of the address book entry in the consumer device, access online presence information of a consumer associated with the consumer device, from the presence server;
customize the business information based on the consumer's online presence information; and
push the customized business information to the consumer device via one or more advanced communication services supported by the enterprise device.

12. The system of claim 11, wherein the enterprise device embodies a commercial enterprise that undertakes business ventures.

13. The system of claim 11, wherein the online presence information includes one or more of a consumer's geo-location information, advanced communication service capabilities information, online status information, and user preference information.

14. The system of claim 11, wherein the one or more advanced communication services include a combination of Short Message Service (SMS), Multimedia Message Service (MMS), Internet Protocol (IP) Multimedia Subsystem (IMS), Wireless Application Protocol (WAP) exchange, structured data transfer, unstructured data transfer, Electronic message (E-Mail) exchange, Instant Messaging (IM) exchange, Wi-Fi, and Near Field Communication (NFC) exchange.

15. The system of claim 11, wherein the business information includes one or more of a factoid, product information, advertisement, promotional offer, coupon, gift voucher, survey questionnaire, opinion poll, catalogue, menu, and retailer credits.

16. The system of claim 11, wherein the enterprise device is operated by a commercial or industrial enterprise that undertakes business ventures.

17. The system of claim 11, wherein the consumer device is operated by persons buying goods or services provided by an enterprise.

* * * * *